(12) United States Patent
Manber (10) Patent No.: US 11,503,092 B2
(45) Date of Patent: *Nov. 15, 2022

(54) VIDEO STREAM PREVIEW

(71) Applicant: Verily Life Sciences LLC, Mountain View, CA (US)

(72) Inventor: Udi Manber, Los Altos Hills, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/339,152

(22) Filed: Jun. 4, 2021

(65) Prior Publication Data

US 2021/0297473 A1    Sep. 23, 2021

Related U.S. Application Data

(63) Continuation of application No. 16/773,845, filed on Jan. 27, 2020, now Pat. No. 11,032,341, which is a
(Continued)

(51) Int. Cl.
*H04L 29/06* (2006.01)
*H04N 21/2343* (2011.01)
(Continued)

(52) U.S. Cl.
CPC ............... *H04L 65/60* (2013.01); *H04L 9/40* (2022.05); *H04L 65/612* (2022.05);
(Continued)

(58) Field of Classification Search
CPC ..... H04L 65/60; H04L 29/06; H04L 65/4084; H04L 65/602; H04L 9/40; H04N 21/2343;
(Continued)

(56) References Cited

U.S. PATENT DOCUMENTS

| 6,243,761 B1 | 6/2001 | Mogul et al. |
| 7,373,415 B1 | 5/2008 | Deshan et al. |

(Continued)

FOREIGN PATENT DOCUMENTS

| EP | 2410744 A1 | 1/2012 | |
| EP | 2587801 A1 * | 5/2013 | ......... H04L 65/1026 |
| EP | 2587801 A1 | 5/2013 | |

OTHER PUBLICATIONS

Honda Hiroshi et al. EP-2587801-A1 (Year: 2013).*
(Continued)

*Primary Examiner* — Tonia L Dollinger
*Assistant Examiner* — Mehulkumar J Shah
(74) *Attorney, Agent, or Firm* — Perkins Coie LLP (57) ABSTRACT

Methods, systems, and apparatus, including computer programs encoded on computer storage media, for generating a video stream preview. One of the methods includes receiving, from a user device, a request for a video stream preview. A payload of data is transmitted from a session system to the user device over a network. A first measure of network transmission quality is determined based on a result of transmitting the payload to the user device over the network from the session system. A second measure of network transmission quality is determined for data transmitted over the network from a session host to the session system. A video stream preview is generated from an example video stream obtained from the user device by degrading the quality of the example video stream according to the first measure of network transmission quality and the second measure of network transmission quality. The video stream preview is displayed on the user device.

20 Claims, 5 Drawing Sheets

Related U.S. Application Data continuation of application No. 14/142,092, filed on Dec. 27, 2013, now Pat. No. 10,587,663.

(60) Provisional application No. 61/829,862, filed on May 31, 2013.

(51) Int. Cl.

| | | |
|---|---|---|
| *H04N 21/24* | (2011.01) | |
| *H04L 65/60* | (2022.01) | |
| *H04L 9/40* | (2022.01) | |
| *H04L 65/612* | (2022.01) | |
| *H04L 65/75* | (2022.01) | |

(52) U.S. Cl.
CPC ....... *H04L 65/762* (2022.05); *H04N 21/2343* (2013.01); *H04N 21/2402* (2013.01)

(58) Field of Classification Search
CPC ... H04N 21/2402; H04N 65/612; H04N 21/24
USPC ........................................................ 709/231
See application file for complete search history.

(56) References Cited

U.S. PATENT DOCUMENTS

| | | | |
|---|---|---|---|
| 7,490,158 B2 | 2/2009 | Xu et al. | |
| 2002/0083187 A1 | 6/2002 | Sim et al. | |
| 2003/0005284 A1 | 1/2003 | Euchner | |
| 2003/0121053 A1 | 6/2003 | Honda | |
| 2004/0153565 A1* | 8/2004 | Bloch | H04L 29/06027 |
| | | | 709/232 |
| 2005/0193341 A1 | 9/2005 | Hayward et al. | |
| 2007/0047542 A1 | 3/2007 | Thukral | |
| 2008/0066102 A1 | 3/2008 | Abraham et al. | |
| 2008/0195748 A1 | 8/2008 | Tierney et al. | |
| 2008/0261605 A1* | 10/2008 | Larsen | H04L 9/40 |
| | | | 455/446 |
| 2008/0292265 A1 | 11/2008 | Worthen | |
| 2009/0124250 A1 | 5/2009 | Topaltzas et al. | |
| 2009/0193485 A1* | 7/2009 | Rieger | H04N 21/251 |
| | | | 725/114 |
| 2010/0037267 A1* | 2/2010 | Bennett | H04N 21/234381 |
| | | | 725/116 |
| 2010/0132002 A1 | 5/2010 | Henocq et al. | |
| 2011/0276710 A1 | 11/2011 | Mighani et al. | |
| 2012/0163203 A1 | 6/2012 | Wilkinson et al. | |
| 2013/0163667 A1 | 6/2013 | Nilsson et al. | |
| 2013/0166731 A1 | 6/2013 | Yamanaka et al. | |
| 2013/0297743 A1 | 11/2013 | Eschet et al. | |
| 2014/0071968 A1* | 3/2014 | Raniere | H04W 48/18 |
| | | | 370/338 |
| 2014/0082146 A1 | 3/2014 | Bao et al. | |

OTHER PUBLICATIONS

International Preliminary Reporton Patentability in International Application No. PCT/US2014/039702, dated Dec. 10, 2015, 6 pages.

International Search Report and Written Opinion in International Application No. PCT/US201/039702, dated Sep. 3, 2014, 9 pages.

Ke, "An Evaluation Framework for More Realistic Simulations of MPEG Video Transmission," J Information Sci Engineering, 2008, 24:425-440 , 2008.

All about Internet Speed Requirements for Hulu, Netflix, and Vudu Movie Viewing: How Fast Must Your Internet be for the Best Video Streaming Experience?, Gonzalez; About.com, retrieved on Jul. 18, 2014, 2 pages http://hometheater.about.com/od/internethometheater2/a/Internet-Speed-for- Netflix-Vudu.htm , 2014.

Spirent Avalanche: High Performance Emulation, Video Quality and Voice Quality Analysis System: Video Quality Analyzer (VQA), http://www.spirent.com/~/media/Datasheets/Broadband/PAB/Avalanche/Spirent_VQA_Detailed_Real-Time_IPTV_Analysis System.pdf; Spirent, Apr. 2013, 8 pages.

* cited by examiner

VIDEO STREAM PREVIEW

CROSS-REFERENCE TO RELATED APPLICATIONS

This application is a continuation of U.S. patent application Ser. No. 16/773,845, filed Jan. 27, 2020, which is a continuation of U.S. patent application Ser. No. 14/142,092, filed Dec. 27, 2013, now U.S. Pat. No. 10,587,663, issued Mar. 10, 2020, which claims priority to U.S. Provisional Patent Application No. 61/829,862, filed on May 31, 2013, entitled "Video Stream Preview," which are incorporated by reference herein in their entirety.

BACKGROUND

This specification relates to environments that connect network-enabled communication devices. Various types of devices, e.g., desktop computers and mobile phones, can communicate with one another using various data communication networks, e.g., the Internet. Network-enabled devices can stream real-time video data to one another at varying levels of quality.

SUMMARY

This specification describes how a system can provide, to a user, a video stream preview that is representative of the quality of video that will be streamed from a session host. The system can provide a near-instantaneous preview of the quality of the video stream without actually receiving any video from the session host by determining a network transmission quality between the session host and the user. The system can then generate video data that represents what streamed video will look like when streamed according to the network transmission quality.

In general, one innovative aspect of the subject matter described in this specification can be embodied in methods that include the actions of receiving, from a user device, a request for a video stream preview; transmitting a payload of data from a session system to the user device over a network; determining a first measure of network transmission quality based on a result of transmitting the payload to the user device over the network from the session system; determining a second measure of network transmission quality for data transmitted over the network from a session host to the session system; obtaining an example video stream; generating the video stream preview from the example video stream by degrading the quality of the example video stream according to the first measure of network transmission quality and the second measure of network transmission quality; and displaying the video stream preview on the user device. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Transmitting the payload of data from the session system to the user device over the network comprises transmitting the payload data using a reliable communication protocol. The actions include providing the video stream preview to the user device using a reliable communication protocol. The second measure of transmission quality is based on a previously computed measure of historical transmission quality from the session host to the session system. The first measure of transmission quality is determined in response to the request for a video stream preview. The actions include receiving a second test payload from the session host, wherein determining the second measure of transmission quality for data provided from the session host to the session system comprises determining the second measure of transmission quality based on a result of receiving the second test payload from the session host. The actions include transmitting the payload data at a faster rate than a rate at which video data is streamed to the user device. The actions include generating the payload of data having a size corresponding to a particular duration of video of a particular quality. Generating a video stream preview comprises simulating network effects on video data streamed from the session host to the user device. The video stream preview represents a predicted quality of a video stream transmitted over a network from a session host to the user device through a session system.

In general, another innovative aspect of the subject matter described in this specification can be embodied in methods that include the actions of receiving, from a user device, a request for a video stream preview; receiving a payload of data from the user device over a network; determining a first measure of network transmission quality based on a result of receiving the payload from the user device over the network; determining a second measure of network transmission quality for data transmitted over the network from a session system to a session host; obtaining an example video stream; generating a video stream preview from the example video stream by degrading the quality of the example video stream according to the first measure of network transmission quality and the second measure of network transmission quality; and displaying the video stream preview on the user device. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Receiving the payload of data from the session system to the user device over the network comprises receiving the payload data using a reliable communication protocol. The actions include providing the video stream preview to the user device using a reliable communication protocol. The second measure of transmission quality is based on a previously computed measure of historical transmission quality from the user device to the session system. The first measure of transmission quality is determined in response to the request for a video stream preview. The actions include providing a second test payload to the session host, wherein determining the second measure of transmission quality for data provided to the session host from the session system comprises determining the second measure of transmission quality based on a result of providing the second test payload to the session host. The actions include receiving the payload data at a faster rate than a rate at which video data is streamed from the user device. The actions include generating the payload of data having a size corresponding to a particular duration of video of a particular quality. Generating a video stream preview comprises simulating network effects on video data streamed to the session host from the user device. The video stream preview represents a predicted quality of a video stream transmitted over a network from the user device to a session host through a session system.

Particular embodiments of the subject matter described in this specification can be implemented so as to realize one or more of the following advantages. A system can generate a video stream preview of video streamed from a session host without actually receiving any video from the session host. A system can provide a near-instantaneous preview of streamed video quality without actually streaming video data between devices. Users can quickly and easily determine the quality of video from session hosts in order to make decisions about sessions that they would like to join. For example, if a user is paying for a session, the user can determine whether the session quality is worth the session price. Thus, if several sessions are available, the user can choose which has the best quality or best quality for a particular price. The user can make such decisions without requiring interaction by a session host or actually streaming video from the session host.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
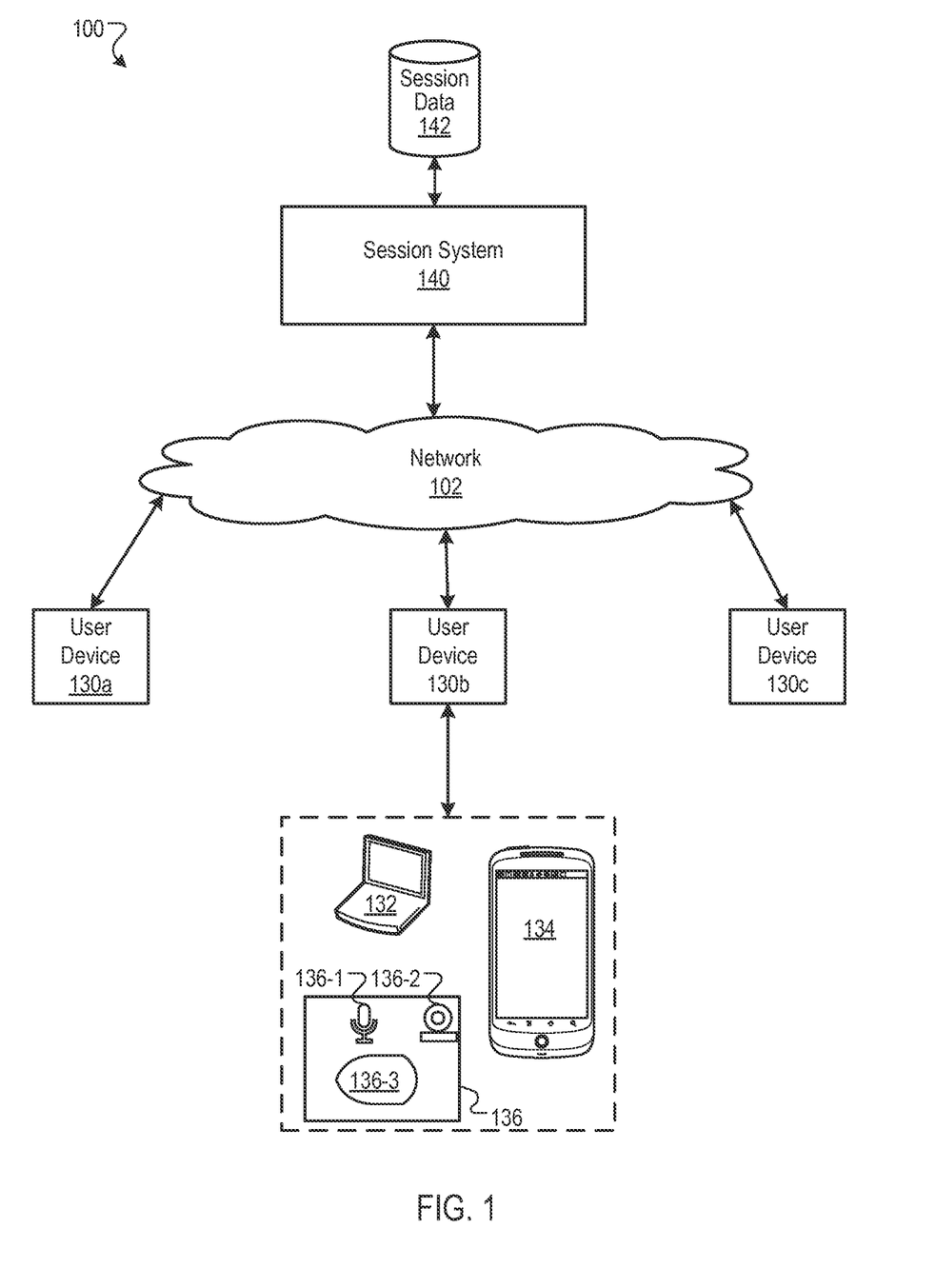
FIG. 1 is a block diagram of an example environment for providing sessions.

FIG. 1 is a block diagram of an example environment 100 for providing sessions. A data communication network 102 enables data communication between multiple network-enabled electronic devices. Users can access content, provide content, exchange information, and participate in sessions by use of the devices and systems that can communicate with each other over the network 102. The network 102 can include, for example, a local area network (LAN), a cellular phone network, a wide area network (WAN), e.g., the Internet, or a combination of them. The links on the network can be wireline or wireless links or both.

A user device 130a-c is an electronic device, or collection of devices, that is under the control of a user and is capable of requesting and receiving resources over the network 102. Generally, a user device 130a-c includes one or more of an audio input device 136-1, a video input device 136-2, a display device 136-3, and optionally other input devices, e.g., for text or gesture input.

Example user devices 130a-c include personal computers 132, mobile communication devices 134, and other devices 136 that can send and receive data over the network 102. A user device 130a-c typically includes a user application, e.g., a web browser, that sends and receives data over the network 102, generally in response to user actions. The user application can enable a user to display and interact with text, images, videos, music and other content, which can be located on at a website on the World Wide Web or on a local area network. User devices 130a-c can also be wearable computing devices that include a camera input device and microphone input device and a wireless connection mechanism that may be worn on a user's person. For example, a user device can include a hat camera system that includes a camera mounted on the brim of a hat, which can connect wirelessly to a mobile computing system, e.g. a mobile phone. User devices can also include other camera systems worn by a person that provide point of view video data, for example a helmet-mounted camera.

A resource is any data that can be provided over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

A session system 140 is accessible by the user devices 130a-c over the network 102. The session system 140 can be implemented as computer programs installed on one or more computers in one or more locations that are coupled to each through a network. The session system 140 allows people to organize, request, and participate in sessions. In a session, a person interacts with another person or with a computer system, e.g., a software agent, which may be part of the session system 140. For example, one person, a "session host" can use the session system 140 to provide real-time video data, which may be referred to as a "video stream" or a "live feed," to a user device of another person. In this context, "real-time" video data means that the sponsor observes only minimal appreciable delays due to processing limitations of the session system 140. In some instances, the other person or system acts purely as an observer. In many instances, the other person or system plays an active role, and information goes in both directions during the session and both participants can be considered session hosts. For example, one person can ask the other person questions during the session, e.g. after observing video provided in the session. The term "session" may thus refer to such an interaction, the period of interaction, or a recording of such an interaction, as the context requires. Both a person and a system, e.g., a software agent, may be referred to as participants in a session. The participation of a system participant may be defined by a computer program or a script, which may be referred to as a session program or as the program of a session.

Session requests, indications of session availability, and statistics of real-time and historical transmission quality between the session system 140 and user devices 130a-c can be stored as sessions data 142. A person can use a user device 130a-c to access the session system 140 to request a session from a particular available session host. The session system 140 can provide a user interface to the user devices 130a-c presenting available session hosts, which may be arranged in a particular way, for example, according to a topical hierarchy. In some implementations, the session system 140 includes a search subsystem that allows users to search for session hosts who are available to provide sessions.

The session system 140 can then initiate a session, and a user, who may or may not be a host, then experiences a session by use of a user device 130a-c. Other types of input and output devices may also be used, depending on the type of session.

In situations in which the systems discussed here collect personal information about users, or may make use of personal information, the users may be provided with an opportunity to control whether programs or features collect user information, e.g., information about a user's social network, social actions or activities, profession, a user's preferences, or a user's current location, or to control whether and/or how to receive content from the content server that may be more relevant to the user. In addition, certain data may be treated in one or more ways before it is stored or used, so that personally identifiable information is removed. For example, a session participant's identity may be treated so that no personally identifiable information can be determined by the host and vice-versa, or a session host's geographic location may be generalized where location information is obtained (such as to a city, ZIP code, or state level), so that a particular location of a session host cannot be determined. Thus, the session host may have control over how information is collected and used by a the session system 140.

Figure 2:
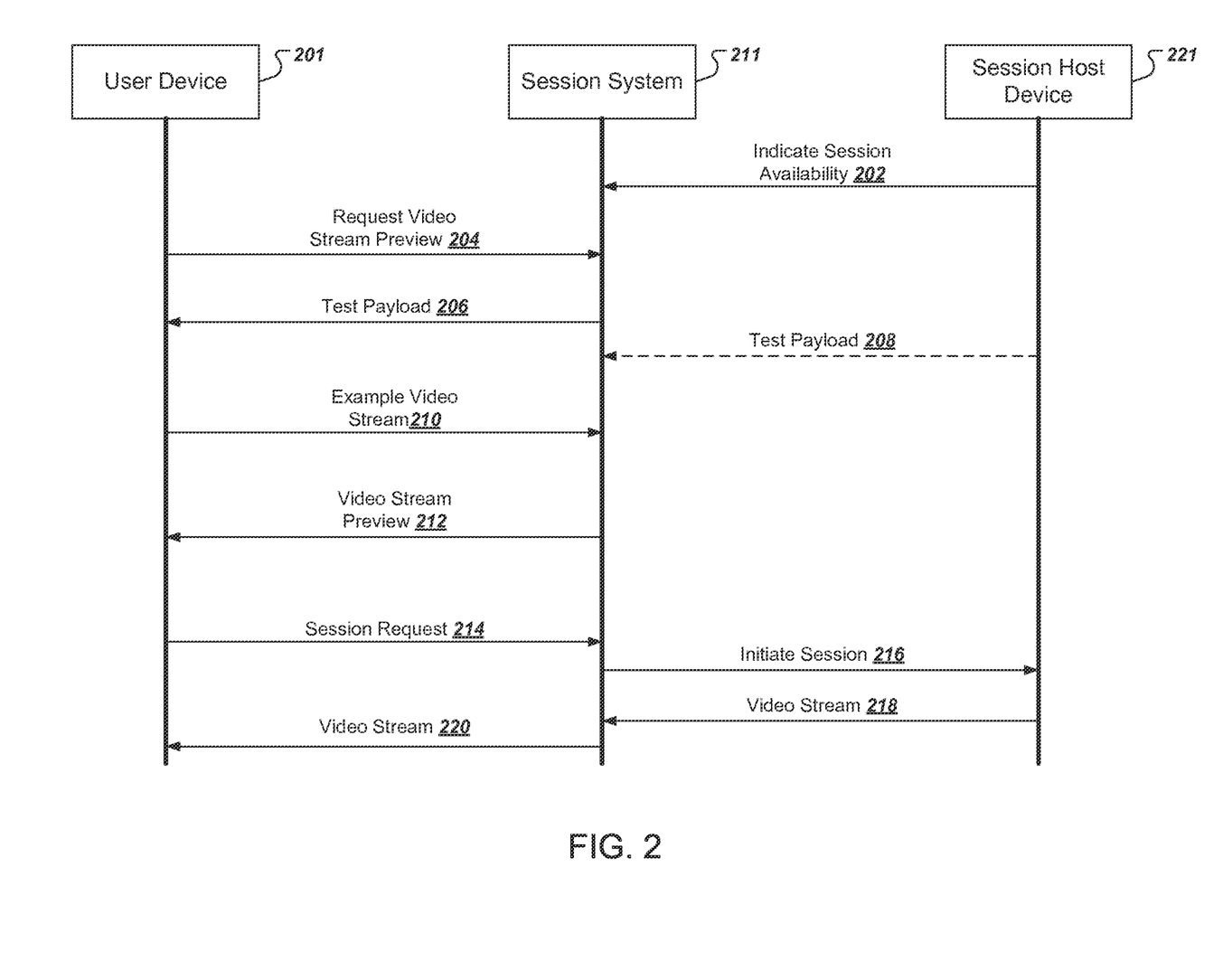
FIG. 2 is a sequence diagram that illustrates providing a video stream preview of session host video.

FIG. 2 is a sequence diagram that illustrates providing a video stream preview of session host video. In general, a session system 211 can provide to a user device 201 a video stream preview 212 that represents the quality of streamed video data that will be received at the user device 201 from a session host device 221 through the session system 211. The video stream preview 212 can be provided to the user device 201 before any video data is actually received from the session host device 221. Thus, a user of user device 201 can use the video stream preview to make a decision on whether to initiate a session with the session host.

The session host device 221 indicates session availability 202 to the session system 211. For example, a session host can offer to share real-time video data of a particular event, e.g. video of walking around a popular tourist attraction in another country.

The session system 211 can provide an indication of the availability of the session offered by the session host. For example, users can navigate a web browser to a web page provided by the session system 211 to browse session offerings by various session hosts.

Users contemplating initiating a session with a session host may desire to preview the quality of video data that will be received from the session host. Thus, the session system 211 can receive a request for a video stream preview 204 from the user device 201 that requests a preview of video provided from the session host device 221 to the user device 201. In some implementations, a user can initiate the request 204 by selecting a "Preview Host Video Quality" button on a web page provided by the session system 211 to help the user select a session host that is able to provide a video stream of an acceptable quality.

However, the session system 211 need not actually obtain any video data from the session host in order to generate a video stream preview. Instead, the session system can determine an overall transmission quality between the session host device 221 and the user device 201 through the session system 211 and generate a video stream preview that represents the quality of video streamed on a network characterized by the overall transmission quality. For example, the session system 211 can provide a test payload 206 to the user device 201 to measure the transmission quality from the session system 211 to the user device 201. The session system 211 can optionally receive a test payload 208 from the session host device 221 to measure the transmission quality from the session host device 221 to the session system 211. The session system 221 can alternatively or in addition measure the transmission quality with the session host device 221 from historical data.

The session system 211 can then receive an example video stream 210 from the user device 201 and provide a generated video stream preview 212 to the user device 201. For example the user device 201 can capture a few seconds of video as the example video stream 210 to be used in generating the video stream preview. Alternatively, the session system 211 can use previously stored video data to generate the video stream preview 212.

The user can then view the video stream preview 212 to observe a predicted quality of video streamed from the session host device 221. Notably, the user can preview the quality of video streamed from the session host device 221 before actually receiving any video data from the session host device.

If satisfied with the predicted quality of the video stream preview, the user can initiate a session by causing the user device 201 to provide a session request 214 to the session system 211. The session system 211 can then initiate a session 216 with the session host device 221. In response, the session host device 221 can begin providing a video stream 218 to the session system 211. The session system 211 then forwards the video stream 220 to the user device 201.

Figure 3:
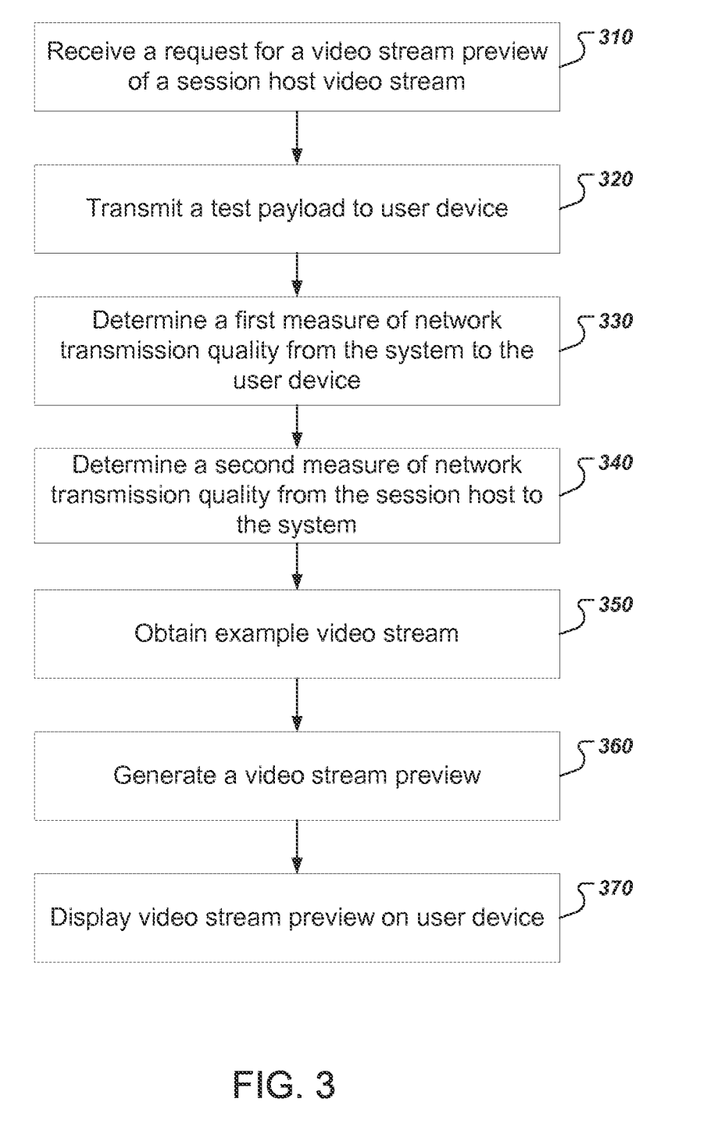
FIG. 3 is a flow chart of an example process for providing a user a video stream preview.

FIG. 3 is a flow chart of an example process for providing a user a video stream preview. The process will be described as being performed by a system of one or more computers, e.g., the session system 211 of FIG. 2.

The system receives a request for a video stream preview of a session host video stream (310). The request will generally identify a particular session host offering to initiate a session that provides real-time streaming video data.

The system transmits a test payload to a user device (320). The system can measure the transmission quality from the system to the user device over a network using the test payload. The system can for example generate a test payload having a size that corresponds to video data of a particular duration, e.g. 5, 10, or 30 seconds of video data of a particular resolution or quality. Although used to generate a video stream preview, the test payload data need not be video data and need not be formatted as streaming video data. In some implementations, the test payload data is random data or empty data. The system can also send the test payload in multiple segments and vary the sizes of the segments in order to test the transmission quality for multiple data sizes.

Furthermore, the test payload need not be transmitted to the user device at a rate that real-time video data would be expected to be streamed to the user device. Rather, the test payload can be provided at a rate that is faster than video data would be streamed to the user device in real-time, and may be provided at a rate that is as fast as the devices of the system and user device will allow.

The system can also transmit the test payload to the user device using a communication protocol that is different from a communication protocol that is used to transmit streaming video. For example, the system can transmit the test payload using a reliable data communication protocol, e.g. transport control protocol (TCP) over Internet protocol (IP), that requests retransmission of dropped packets, rearranges out-of-order packets, or performs other mechanisms to ensure reliable transmission of data. In contrast, the session host and the session system may transmit streaming video to the user device using an unreliable, streaming communication protocol, with fewer delivery guarantees, in order to stream real-time video data, e.g. real-time transport protocol (RTP) over user datagram protocol (UDP).

The system determines a first measure of network transmission quality from the system to the user device (330). The system can compute a measure of network transmission quality based on a result of transmitting the test payload to the user device. The measure of network transmission quality can include one or more statistics that characterize the real-time performance of the connection between the session system and the user device when providing the test payload. For example, the system can compute a bit rate or bandwidth, a network throughput, a data transfer rate, a predicted number of dropped data packets, a predicted number of dropped video frames, or any other appropriate statistics that indicate network transmission quality. The system can compute measures of central tendency for any of the statistics, e.g. an arithmetic mean or geometric mean, a median, a mode, a minimum, or a maximum. The system can also combine one or more of the computed statistics into a single measure of transmission quality from the system to the user device. For example, the system can compute weights for each of the statistics that indicate an importance of each particular statistic for predicting the quality of streamed video. In some implementations, the user device computes all or a portion of the network transmission quality statistics. For example, the user device can compute an average bandwidth from providing the test payload and communicate the computed average bandwidth to the session system.

The system determines a second measure of network transmission quality from the session host to the system (340). The system can compute a second measure of transmission quality from the session host to the system in a number of ways. In some implementations, the system requests and receives a second test payload from the session host and computes one or more statistics of transmission quality from the received test payload, as described in more detail above with reference to steps 320 and 330. The system can use the received test payload to compute a current, up-to-date indication of transmission quality from the session host to the system.

The system can also obtain data representing historical transmission quality from the session host to the system. For example, the system can obtain one or more previously computed statistics of network transmission quality from the session host to the system, e.g. based on the performance of previous sessions by the session host with other user devices.

The system can either use the current transmission quality, the historical transmission quality, or both to determine the second measure of transmission quality from the session host to the system. For example, the system can choose the worst of the two or the best of the two. The system can also use both measures of transmission quality to compute an aggregate predicted transmission quality. The system can compute a measure of central tendency, e.g. an arithmetic or geometric mean, between the current and historical transmission quality. The system can also use a prediction model that uses both the current and historical measures of transmission quality to compute a predicted transmission quality for streaming video from the session host.

The system can also combine the first measure of transmission quality and the second measure of transmission quality to determine an overall measure of network transmission quality from the session host to the user device through the system. The system can use the first measure of transmission quality from the system to the user device and the second measure of transmission quality from the session host to the system to determine an overall measure of transmission quality.

The system may be a distributed computing system that includes multiple data centers connected through private internal networks, external networks, or some combination of the two. Thus, the system may also use internal transmission quality statistics, for example between two data centers, to compute the overall transmission quality from the session host to the user device.

The system obtains an example video stream (350). The system can obtain video data for generating a video stream preview in a number of ways. In some implementations, the system receives a video stream sampled at the user device, e.g. a short video clip of the user. The system can also obtain a previously stored test video. The system may allow the user to select a particular test video for the video stream preview. The system may also automatically select test video that matches a category for the type of session being offered, e.g., a test video of a kitchen for a session on learning on to cook or a test video of a studio for a session on learning the guitar. The system can also use previously obtained video streamed from the session host. The example video stream need not actually be streamed to the system from the user device, and may instead be transmitted using reliable network communication protocols.

The system generates a video stream preview (370). The system will generally degrade the received video data to simulate the degradation that is likely to occur based on the transmission quality between the session host and the user device through the system. For example, the system can use the overall transmission quality to compute network effects on the received video data. For example, the system can encode the received video data and simulate the results of streaming the encoded video data over a network characterized by the overall transmission quality. The system can simulate a variety of effects on the video data including simulating packet loss, a number of packet retransmissions requested, frame loss, or a percent of decodable frames. The system can then decode the video data sent over the simulated network to generate the video stream preview. The system may alternatively modify the received video data directly to correspond to predicted network effects from providing the video data over the network. For example, the system can mark a number of video frames as undecodable, where the number corresponds to the simulated percent of decodable frames. Similarly, the system can erase or overwrite portions of the video data to simulate packet or frame loss from the network. The system can also alternatively or in addition modify the video by reformatting the video to be in a lower-quality format, for example, to a lower resolution, a lower frame rate, or to a compressed format.

In some implementations, the video data is obtained from the user device, and the video stream preview is generated on the user device, e.g. by a web browser on the user device. The system can provide to the browser the computed measure of overall transmission quality from the session host to the user device. The browser can then obtain sample video data from a camera connected to the user device, and the browser can then generate the video stream preview based on the measure of overall transmission quality.

The system provides the video stream preview to the user device (380). The system can generate a video stream preview that is small enough in size that the delay in transferring the video stream preview to the user device is negligible.

In some implementations, the system generates a video stream preview that simulates network degradation only between the session host and the session system. The system then streams the video stream preview to the user device, allowing actual real-time network effects between the user device and the session system to further degrade the video in order to provide a realistic preview of video streamed from the session host.

A user of the user device can then view the video stream preview to get a sense of the likely quality of video streamed from the session host, and without the user device or the session system actually receiving any video data from the session host. The system can, over time, improve the accuracy of the video stream preview by collecting, over time, additional information about network transmission quality from the system to the user device as the user is viewing the video stream preview.

Figure 4:
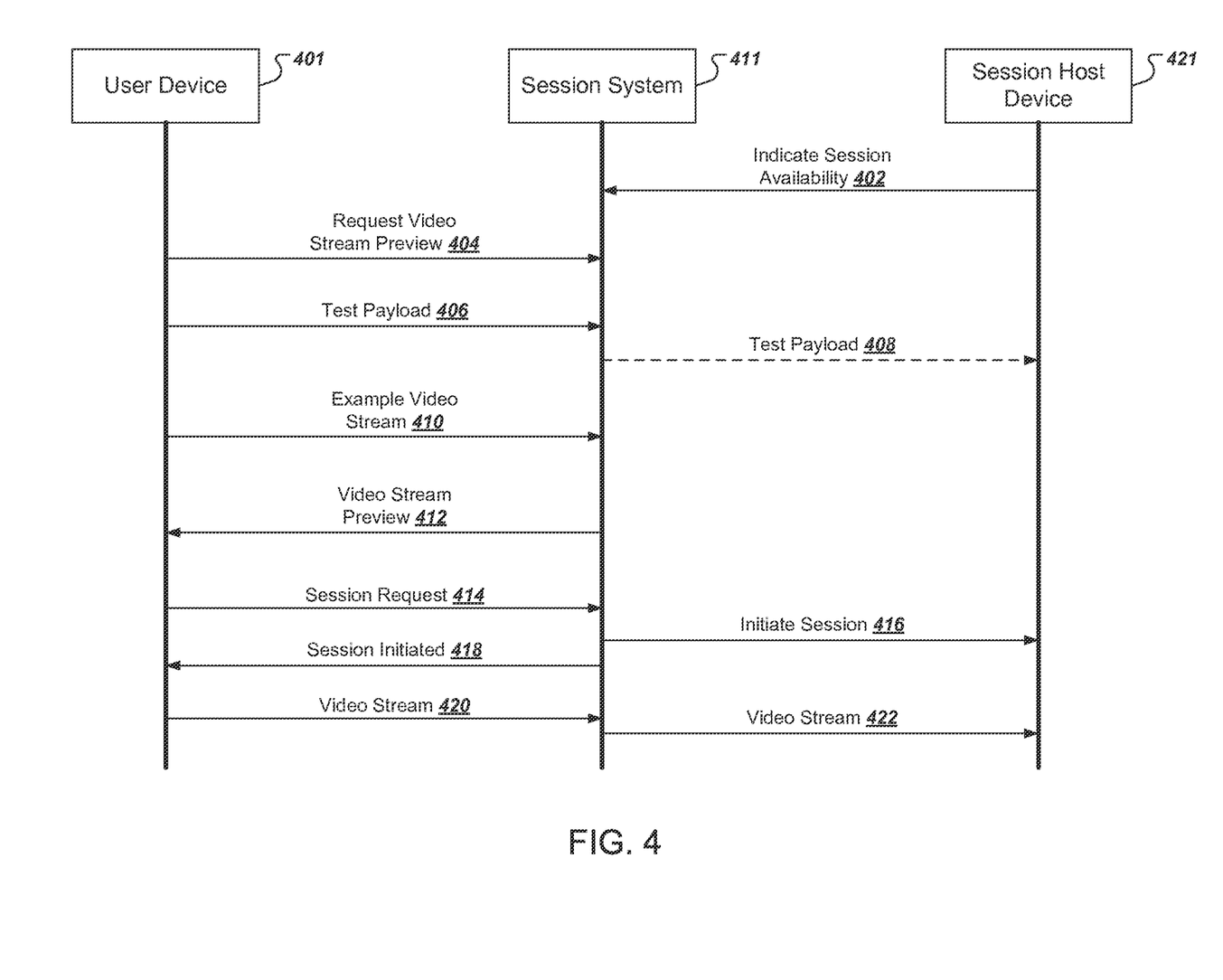
FIG. 4 is a sequence diagram that illustrates providing a video stream preview of user device video.

FIG. 4 is a sequence diagram that illustrates providing a video stream preview of user device video. In some cases, a user may want a preview of his or her own video quality, in other words, video quality from the user device as seen by a session host. In general, a session system 411 can provide to a user device 401 a video stream preview 412 that represents the quality of video data that will be streamed to the session host device 421 from the user device 401 through the session system 411. The video stream preview 412 can be provided to the user device 401 before any video data is actually streamed to the session host device 421. Thus, a user of user device 401 can use the video stream preview to make a decision on whether to initiate a session with the session host.

The session host device 421 indicates session availability 402 to the session system 411. The session host may indicate that the session is interactive. For example, the session host may be a plumber who offers to help fix users fix pipes or leaky faucets. A user who desires to initiate a session with the session host may need to ensure that video that they provide to the session host will be of sufficient quality. For example, the session host will need to be able to see a pipe or a leaky faucet shown by the user in order to help the user fix the problem.

Thus, the session system 411 can receive a request for a video stream preview 204 from the user device 401 that requests a preview of video provided by the user device 201 to the session host device 421. In some implementations, a user can initiate the request 204 by selecting a "Preview My Video Quality" button on a web page provided by the session system 411.

The session system 411 can then determine transmission quality from the user device 401 to the session system 411 by receiving a test payload 406 from the user device 401. The session system 411 can also determine transmission quality from the session system 411 to the session host device 421, either using historical connection data or by optionally transmitting a test payload 408 to the session host device. The system can then use these measures of transmission quality to compute an overall measure of transmission quality from the user device 401 to the session host device 421.

The session system 411 can then receive user video data 410 from the user device 401 and provide a generated video stream preview 412 to the user device 401 that represents the quality of video that will be streamed from the user device 401 on the session host device 421. The video stream preview 412 can demonstrate the quality of video on the session host device 421 without actually transmitting any video to the session host device 421

If the user is satisfied with the quality of video to be provided to the session host, the user can then provide a session request 414 to the session system 411, and the session system 411 can initiate a session 416 with the session host device 421. After initiating the session, the session system 411 can provide a session initiated indication 418 to the user device 401. The user device 401 can then begin sending a real-time video stream 420 to the session system 411, and the session system 211 can forward the video stream 422 to the session host device 421.

Figure 5:
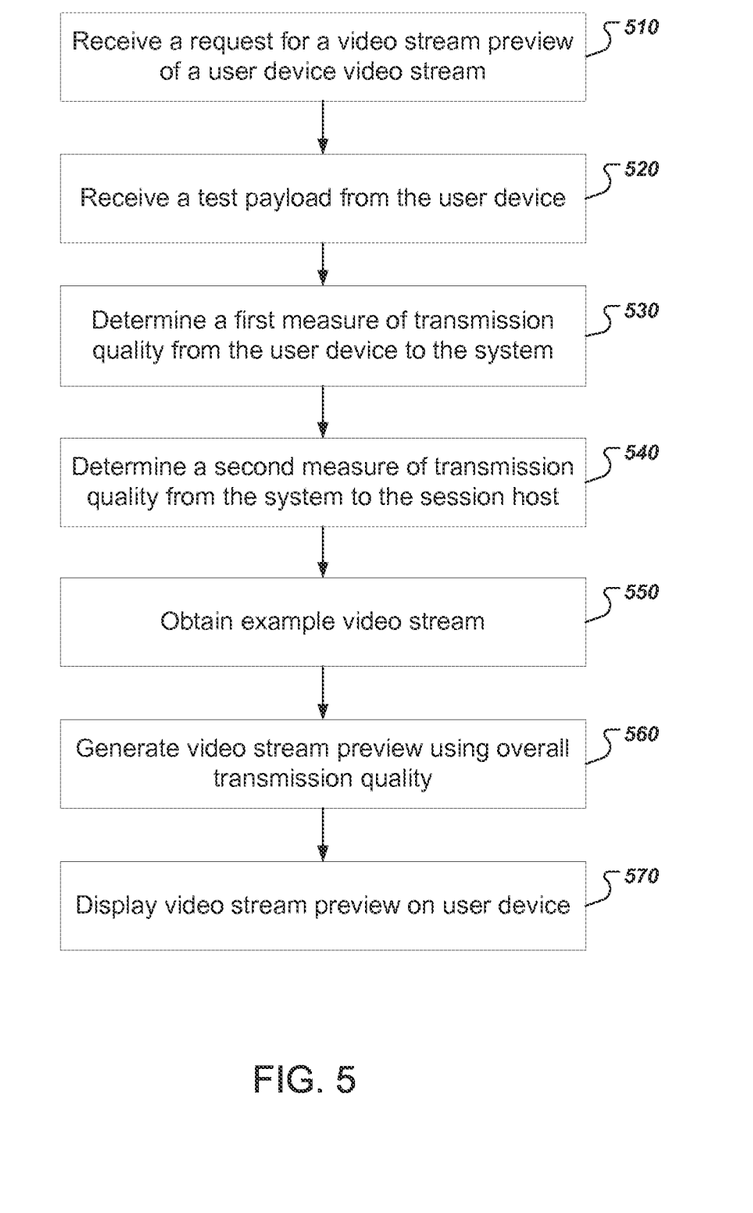
FIG. 5 is a flow chart of an example process for providing a user a preview of user device video quality.

FIG. 5 is a flow chart of an example process for providing a user a preview of user device video quality. The process will be described as being performed by a system of one or more computers, e.g. the session system 411 of FIG. 4.

The system receives a request for a video stream preview a user device video stream (510).

The system receives a test payload from the user device (520). The test payload can be generated as described above with reference to FIG. 3. However, the test payload will be transmitted from the user device to the system. Thus, the system can either first provide the test payload to the user device, and the user device can provide the test payload back to the system. Alternatively, the user device can generate the test payload, e.g. by a browser installed on the user device.

The system determines a first measure of network transmission quality from the user device to the system (530). The first measure of network transmission quality can be determined based on a result of the test payload being transmitted from the user device to the system. The first measure of transmission quality can be determined as described above with reference to FIG. 3.

The system determines a second measure of transmission quality from the session system to the session host (540). The system can for example transmit a test payload to the session host and compute the measure of network transmission quality based on network performance when transmitting the test payload. The system can also obtain data representing historical network transmission quality from the system to the session host. The system can combine the current and historical measures of network transmission quality, as described above with reference to FIG. 3.

The system can also combine the first measure of transmission quality and the second measure of transmission quality to determine an overall measure of network transmission quality from the user device to the session host. The system can determine the measure of overall network transmission quality, as described above with reference to FIG. 3.

The system obtains an example video stream (550) and generates a video stream preview (560), for example, as described above with reference to FIG. 3.

The system displays the video stream preview on the user device (570). A user of the user device can then watch the video stream preview to get a sense of the likely quality of video that will be streamed to the session host, and without the session host having to actually receive any video from the user device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   transmitting, a user device, a request to a session system requesting a video stream preview associated with a session host; and
   receiving, by the user device from the session system, the video stream preview generated based on an estimated aggregated network transmission quality for data transmitted between the session host and the user device, wherein the estimated aggregated network transmission quality is determined by aggregating (1) a first measure of network transmission quality for data transmitted between the session system and the user device, and (2) a second measure of network transmission quality for data transmitted between the session host and the session system.

2. The method of claim 1, comprising:
   initiating a video stream session with the session host upon determining that the video stream preview satisfies a quality threshold; and
   receiving, by the user device, video data from the session host during the video stream session.

3. The method of claim 1, wherein the first measure of network transmission quality is determined based on a first test payload transmitted between the session system and the user device.

4. The method of claim 1, wherein the second measure of network transmission quality is determined based on a second test payload transmitted between the session host and the session system.

5. The method of claim 1, wherein at least one of the first measure of network transmission quality or the second measure of network transmission quality is determined from historical data transmissions.

6. The method of claim 1, comprising:
   transmitting, by the user device, a sample video to the session system to enable the session system to generate the video stream preview using the sample video.

7. A computer-implemented method, comprising:
   estimating, by a session system in response to a request from a user device requesting a video stream preview associated with a session host, an aggregated network transmission quality for data transmitted between the session host and the user device by aggregating (1) a first measure of network transmission quality for data transmitted between the session system and the user device, and (2) a second measure of network transmission quality for data transmitted between the session host and the session system; and
   generating the video stream preview based on the estimated aggregated network transmission quality.

8. The method of claim 7, comprising:
   determining the first measure of network transmission quality based on a first test payload transmitted between the session system and the user device.

9. The method of claim 7, comprising:
   determining the second measure of network transmission quality based on a second test payload transmitted between the session host and the session system.

10. The method of claim 7, comprising:
    determining at least one of the first measure of network transmission quality or the second measure of network transmission quality based on historical data transmissions.

11. A device for receiving video data, comprising a processor that is configured to:
    transmit a request to a session system requesting a video stream preview associated with a session host; and
    receive, from the session system, the video stream preview generated based on an estimated aggregated network transmission quality for data transmitted between the session host and the device, wherein the estimated aggregated network transmission quality is determined by aggregating (1) a first measure of network transmission quality for data transmitted between the session system and the device, and (2) a second measure of network transmission quality for data transmitted between the session host and the session system.

12. The device of claim 11, wherein the processor is configured to:
    initiate a video stream session with the session host upon determining that the video stream preview satisfies a quality threshold; and
    receive video data from the session host during the video stream session.

13. The device of claim 11, wherein the first measure of network transmission quality is determined based on a first test payload transmitted between the session system and the device.

14. The device of claim 11, wherein the second measure of network transmission quality is determined based on a second test payload transmitted between the session host and the session system.

15. The device of claim 11, wherein at least one of the first measure of network transmission quality or the second measure of network transmission quality is determined from historical data transmissions.

16. The device of claim 11, wherein the processor is configured to:
    transmit a sample video to the session system to enable the session system to generate the video stream preview using the sample video.

17. A device for managing video sessions implemented as a session system, comprising a processor that is configured to:
    estimate, in response to a request from a user device requesting a video stream preview associated with a session host, an aggregated network transmission quality for data transmitted between the session host and the user device by aggregating (1) a first measure of network transmission quality for data transmitted between the session system and the user device, and (2) a second measure of network transmission quality for data transmitted between the session host and the session system; and generate the video stream preview based on the estimated aggregated network transmission quality.

18. The device of claim 17, wherein the processor is configured to:

determine the first measure of network transmission quality based on a first test payload transmitted between the session system and the user device.

19. The device of claim 17, wherein the processor is configured to:

determine the second measure of network transmission quality based on a second test payload transmitted between the session host and the session system.

20. The device of claim 17, wherein the processor is configured to:

determine at least one of the first measure of network transmission quality or the second measure of network transmission quality based on historical data transmissions.

* * * * *